United States Patent
Gennermann

(10) Patent No.: US 10,321,319 B2
(45) Date of Patent: Jun. 11, 2019

(54) SECURING ACCESS TO VEHICLES

(71) Applicant: HUF HÜLSBECK & FÜRST GMBH & CO. KG, Velbert (DE)

(72) Inventor: Sven Gennermann, Velbert (DE)

(73) Assignee: Huf Huelsback & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 15/565,876

(22) PCT Filed: Feb. 24, 2016

(86) PCT No.: PCT/EP2016/053865
§ 371 (c)(1),
(2) Date: Oct. 11, 2017

(87) PCT Pub. No.: WO2016/165864
PCT Pub. Date: Oct. 20, 2016

(65) Prior Publication Data
US 2018/0098219 A1 Apr. 5, 2018

(30) Foreign Application Priority Data
Apr. 13, 2015 (DE) .......... 10 2015 105 595

(51) Int. Cl.
*H04W 36/06* (2009.01)
*H04W 36/18* (2009.01)
(Continued)

(52) U.S. Cl.
CPC ............ *H04W 12/08* (2013.01); *B60R 25/24* (2013.01); *G07C 9/00571* (2013.01);
(Continued)

(58) Field of Classification Search
CPC ...... H04W 12/04; H04W 36/06; H04W 36/18
(Continued)

(56) References Cited

U.S. PATENT DOCUMENTS

| 6,732,144 B1* | 5/2004 | Kizu | ............ H04L 29/06 707/999.201 |
| 7,331,047 B2* | 2/2008 | Chu | ............ G06F 9/445 717/173 |

(Continued)

FOREIGN PATENT DOCUMENTS

EP    2 743 868 A1    6/2014

OTHER PUBLICATIONS

International Search Report of International Application No. PCT/EP2016/053865 dated Jun. 14, 2016, 4 pages.

(Continued)

*Primary Examiner* — William D Cumming
(74) *Attorney, Agent, or Firm* — Fay Sharpe LLP

(57) ABSTRACT

A method for securing an access method for vehicles includes a mobile device and a remote control device for administration of access rights. The mobile device is repeatedly connected to the remote control device and characteristic synchronizing data are generated for each connection. One part of the synchronization data is stored in the mobile device and in the remote control device. Characteristic prior synchronization data of a preceding connection is transmitted from the mobile device to the remote control device. A consistency check is performed in the remote control device between the prior synchronization data received from the mobile device and the prior synchronization data stored in the remote control device. If the data are consistent, the connection is terminated and a synchronization interval is waited before the connection is restored for the next synchronization. If the data are inconsistent, the mobile device is blocked from further access to vehicles.

3 Claims, 3 Drawing Sheets

(51) Int. Cl.
*H04W 12/08* (2009.01)
*G07C 9/00* (2006.01)
*H04W 12/12* (2009.01)
*H04L 29/08* (2006.01)
*B60R 25/24* (2013.01)
*B60R 25/20* (2013.01)

(52) U.S. Cl.
CPC .......... *H04L 29/0854* (2013.01); *H04L 67/04* (2013.01); *H04L 67/1095* (2013.01); *H04L 67/1097* (2013.01); *H04L 67/12* (2013.01); *H04W 12/12* (2013.01); *B60R 25/2018* (2013.01); *B60R 2325/101* (2013.01); *B60R 2325/103* (2013.01); *B60R 2325/205* (2013.01); *H04L 2463/121* (2013.01)

(58) Field of Classification Search
USPC .......................................... 455/410, 436, 437
See application file for complete search history.

(56) References Cited

U.S. PATENT DOCUMENTS

| | | | | |
|---|---|---|---|---|
| 7,484,008 | B1* | 1/2009 | Gelvin | G06F 15/173 709/249 |
| 7,891,004 | B1* | 2/2011 | Gelvin | G06F 15/173 726/26 |
| 8,380,165 | B1 | 2/2013 | Koller et al. | |
| 8,707,382 | B2* | 4/2014 | Wollmershauser | H04N 21/242 725/133 |
| 2005/0071208 | A1* | 3/2005 | Brennen | G06Q 10/06393 705/2 |
| 2005/0124344 | A1* | 6/2005 | Laroia | H04W 36/18 455/436 |
| 2005/0124345 | A1* | 6/2005 | Laroia | H04W 36/06 455/437 |
| 2005/0283209 | A1* | 12/2005 | Katoozi | A61N 1/37252 607/60 |
| 2006/0029139 | A1* | 2/2006 | Teichner | H04L 43/106 375/240.28 |
| 2008/0228948 | A1* | 9/2008 | Nilius | H04L 51/36 709/251 |
| 2009/0205008 | A1* | 8/2009 | Wollmershauser | H04N 21/242 725/131 |
| 2011/0208532 | A1* | 8/2011 | Rahman | G06F 19/3418 705/2 |
| 2012/0078383 | A1* | 3/2012 | Takahashi | H04L 41/0846 700/7 |
| 2014/0040621 | A1* | 2/2014 | Klimke | H04W 12/04 713/171 |
| 2014/0075004 | A1* | 3/2014 | Van Dusen | H04L 41/04 709/223 |
| 2015/0191152 | A1* | 7/2015 | Gennermann | B60R 25/20 180/287 |
| 2016/0311400 | A1* | 10/2016 | Gennermann | B60R 25/2018 |
| 2017/0096123 | A1* | 4/2017 | Gennermann | B60R 25/241 |
| 2017/0235848 | A1* | 8/2017 | Van Dusen | H04L 41/04 705/12 |
| 2017/0249792 | A1* | 8/2017 | Gennermann | B60R 25/24 |
| 2018/0098219 | A1* | 4/2018 | Gennermann | G07C 9/00571 |
| 2019/0075441 | A1* | 3/2019 | Gennermann | H04W 4/80 |

OTHER PUBLICATIONS

International Preliminary Report on Patentability of International Application No. PCT/EP2016/053865 dated Oct. 17, 2017 and English translation, 13 pages.

* cited by examiner

SECURING ACCESS TO VEHICLES

The invention relates to a method for securing an access method. In particular, the invention relates to the field of access to motor vehicles.

BACKGROUND

An authorization for the access to motor vehicles has so far usually been checked via a key component, e.g. a radio key or so-called ID transponder. That user who is carrying the key is authorized to access vehicle functions. Systems are known thereby that require no active unlocking or authorization process, so-called Keyless Entry Systems and Keyless Go Systems.

Furthermore, in particular from the field of the car sharing concept, it is also known that after the registration procedure, the access to vehicles can take place with a key card or a mobile telephone.

In the field of vehicles used privately or for business, with a substantially limited group of users, an access possibility via mobile devices is likewise known, but there are reservations regarding the security of such concepts.

There are various approaches for storing the authorization information for access to a vehicle in a mobile device (e.g. a smartphone). The owner or administrator of a vehicle can grant rights to a user of the vehicle, and these rights are retrievably stored with an appropriate application and data on a cellular telephone dedicated to the user. In the simplest conception, a vehicle then has a control system, which communicates with the cellular telephone (e.g. via a Bluetooth of the NFC connection). When accessing the vehicle, the stored legitimation is checked, and access to the vehicle is provided on the basis thereof.

In more advanced systems, both a control unit in the vehicle, as well as the mobile device, communicate with a central, secure platform, which is provided, for example, by a service provider or a vehicle manufacturer. A higher security level can be ensured through this relay point.

Moreover, it may be provided that the user of a cellular telephone must identify himself to this cellular telephone by means of an ID or biometrical data, before he obtains access to the data stored in the mobile device, and thus to a vehicle.

The aforementioned concepts offer a robust security regarding typical accesses, but it would be worthwhile, however, to further improve the security. By way of example, systems still do not offer a comprehensive security when a mobile device (smartphone) has been cloned by malicious third parties. It is fundamentally possible (with significant effort) to create an exact copy of a mobile device, in particular a smartphone. For this, identical hardware, for example, can be used, onto which a software system image of the cloned mobile device is uploaded. The IDs stored in the hardware itself, which fundamentally cannot be manipulated because they are stored in the hardware, can be intercepted and manipulated, for example, beneath the operating system, such that an identical hardware is simulated for both the operating system as well as connected third parties. Security against such a process has not yet been implemented in the prior concepts.

The object of the invention is to provide an additional security in the authorization processes for access to vehicles.

The object is achieved in accordance with the invention by a method having the features of claim 1.

BRIEF SUMMARY

In accordance with the invention, a mobile device, in particular a smartphone is used, having an application running on it for managing the access to vehicles in the vicinity of this mobile apparatus. A smartphone equipped in this manner can communicate with a central platform as well as with a security system in a vehicle. It is also possible, however, that only one vehicle unit and the smartphone are used, without a central platform.

The important thing is that in accordance with the invention, the mobile device and the application running on it are configured such that the mobile device repeatedly makes contact with a remote location, e.g. a central platform or a vehicle control system. The intervals of these contacts can be randomly varied within a certain range, or prescribed at a fixed interval. By way of example, periods of 10 minutes, or 60 minutes, or even numerous hours between establishing contact may be provided.

Establishing the contacts does not require any user action as the devices establish and process the contacts automatically.

Characteristic and distinct data for the respective contact are stored in the mobile device as well as in remote locates with each contact. By way of example, the characteristic data can be composed of a timestamp, which documents the contact. Alternatively, the mobile device can receive a small data packet transmitted with randomly generated content. Furthermore, it is checked, according to the invention, with each contact, whether the data of a preceding contact, e.g. the immediately preceding contact, are consistent with one another. It is thus determined with each contact whether the identical timestamp or data set of the preceding contact is present at both ends. For this, the mobile device transmits the data packet transmitted in the preceding contact back to the remote location each time it establishes contact, which then carries out a comparison with the previously transmitted data packet.

If there is any inconsistency in this check, it can be reacted to in that the access to a vehicle by this mobile device is blocked. For this, a blocking is initiated in the remote location, thus in the central platform, and/or directly in the control unit of the vehicle.

BRIEF DESCRIPTION OF THE DRAWINGS

The sequence of an embodiment of the method is illustrated by way of example in the attached drawing of FIG. 1.

DETAILED DESCRIPTION

A substantial feature of the invention thus comprises the provision and automatic refreshing and synchronization of data between that in the mobile device and the control unit in the vehicle, or the central platform. This protects against a cloned mobile device being able to be operated with a false identity. The repeated synchronization process can be initiated without difficulty by an application on the mobile device. The synchronization interval can and should be varied randomly, within certain limits, in order to reduce any systematic and predictable behavior of the contact.

If, for example, two devices, a legitimate device and an unauthorized device clone, access the remote location, e.g. the central platform, in accordance with this synchronization process according to the invention, the data will not be consistent, because with each contact, a new synchronization datum is stored at each end. With the first access by another device, it is determined that the synchronization data of the preceding contact are not consistent therewith, which can cause access to a vehicle to be blocked.

If a cloned mobile device is first employed after the copying process, and after a significant delay, the original device will have already received new synchronization data, and the synchronization data will have likewise have been updated at the remote location.

With the first attempt to synchronize the illegal clone, it will be determined that the synchronization data are not identical, and access to the vehicle will be blocked.

In accordance with the invention, the central element of the method is thus the process of the repeated security synchronization between the mobile device and a remote location, and the storage of data that is characteristic and distinct for the respective synchronization process. With each subsequent synchronization process, the data from a preceding, preferably immediately preceding, synchronization process are compared, and an access to a central system or a vehicle is prevented when the compared data are not consistent.

Figure 1:
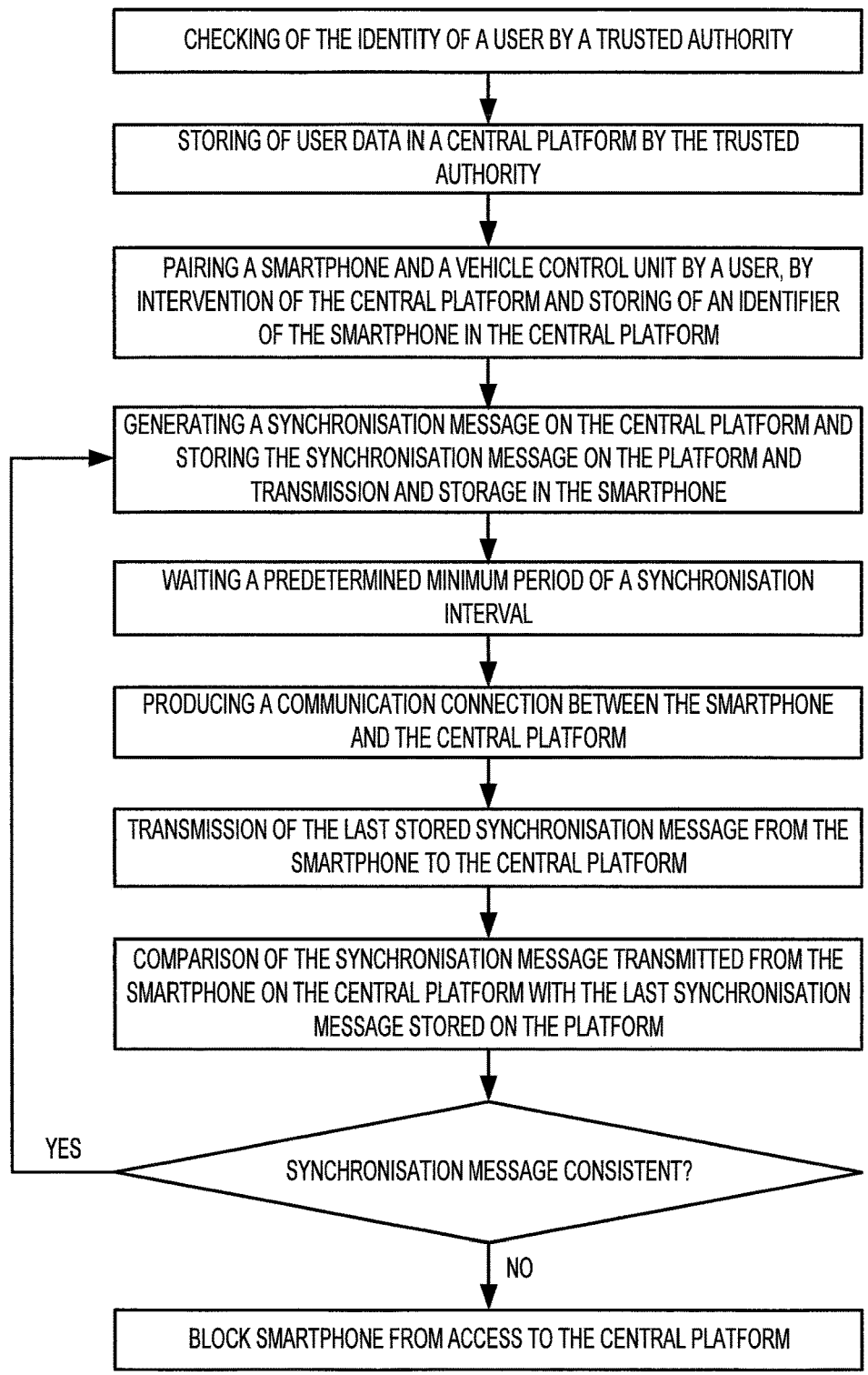
Figure 2:
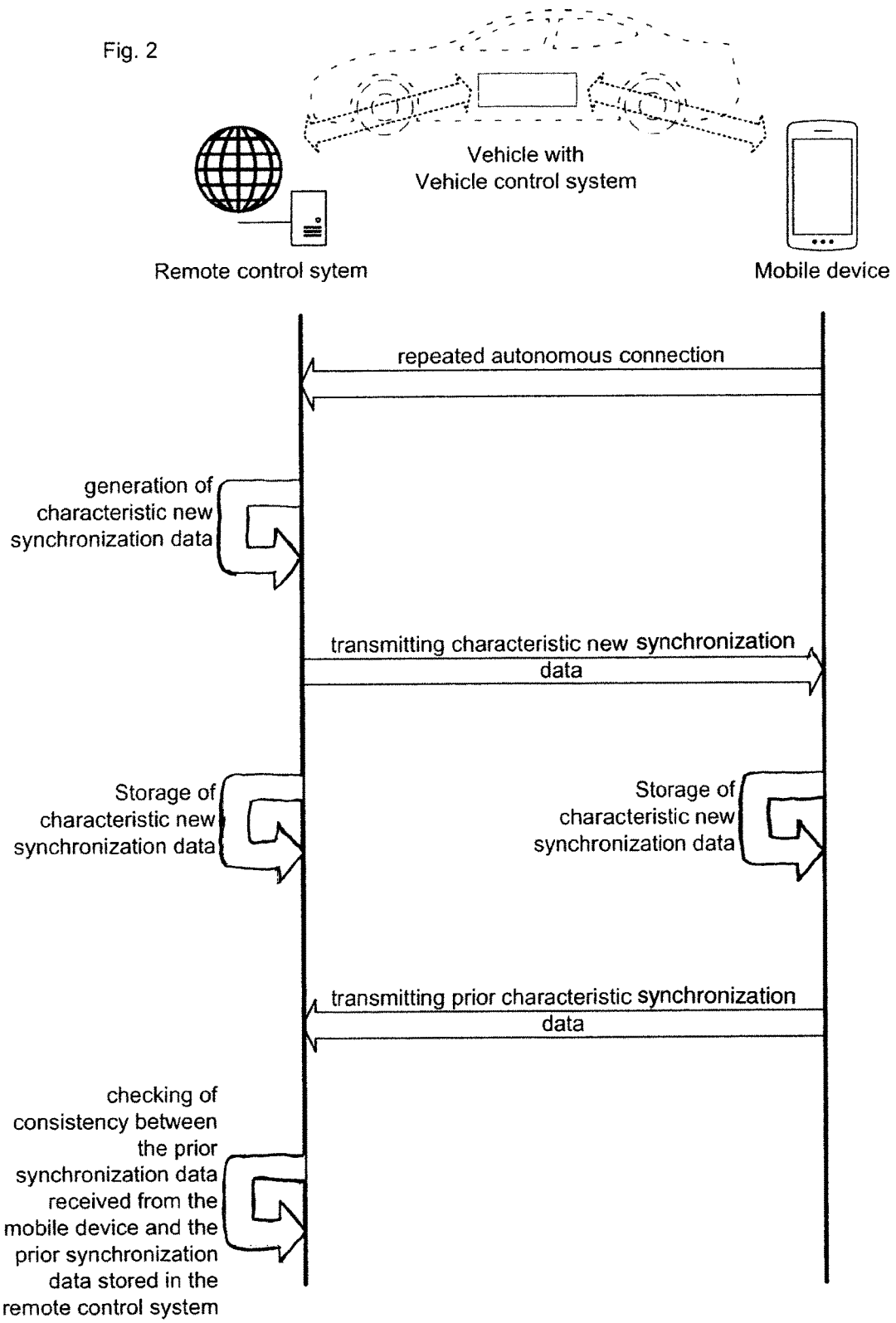
FIG. 2 is a schematic view of the method for securing access including a remote control system, a vehicle with a vehicle control system and a mobile device.

It is beneficial in the framework of the present invention when each synchronization process is confirmed, such that after a transmission of the data, the data that have just been transmitted are checked, in order to eliminate the possibility of a defective transmission and storage. Preferably, a reciprocal checking of the transmitted and stored data thus takes place with each synchronization and transmission of new synchronization data (see FIG. 2). If, for example, a timestamp is used for the characteristic information, it is also important that the temporal synchronization of the devices is ensured. It is easier to implement this when the remote location from the mobile device transmits, as a master of the synchronization, a data packet (e.g. the timestamp) to the mobile device, and this mobile device stores these data as characteristic data of the contact. In a subsequent communication, these data are returned, checked at the remote location, and if the check is positive, a new data packet is returned to the mobile device (see FIG. 2).

Because the data are regularly updated, and not generated according to an algorithm on the cellular telephone, such a measure prevents the copying of a mobile device. When numerous devices with fake identities access the same remote location, it will be noticed.

The invention is preferably used in a system where a central office having administrative rights coordinates the access rights between mobile devices and vehicles. In such systems, the central office, for example, verifies the identity of a user. It is often provided with such systems that a trustworthy office, e.g. the vehicle dealer, enters the registration in the central data base, and both the vehicle unit in the vehicle itself, as well as the mobile device are dependent on these central registrations. In such a case, the synchronization preferably takes place between the mobile device and the central office, wherein the mobile device and the central office can be connected via a wireless data line.

Because each synchronization exchanges only very small amounts of data, such a system can run without significant load to the data traffic or the operation of the mobile device. The type of data exchange is substantially arbitrary, e.g. data messaging via a data network, e.g. phone calls from a secure internet site, or a data exchange via proprietary protocols.

Figure 3:
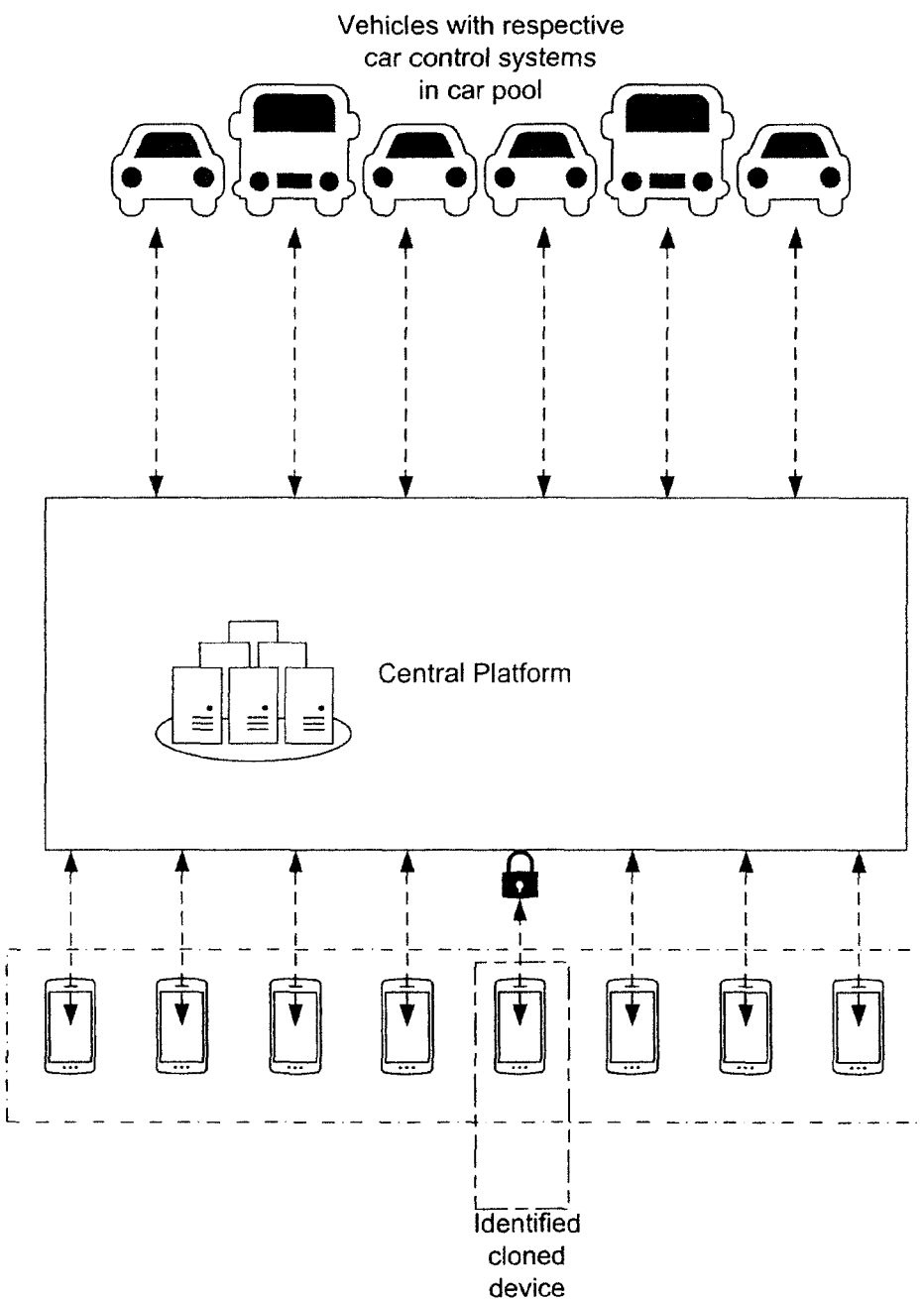
FIG. 3 is a schematic view of a central platform communicating with a set of mobile devices and with a set of vehicles.

As soon as the central platform determines that the transmitted synchronization data are not consistent, it blocks the respective privileges of the device dedicated thereto, and shares this with a vehicle unit, which is likewise in contact with the central platform (see FIG. 3).

The user is informed of the blocking of such a system, e.g. by means of a phone call or transmission of an appropriate message. There is also the possibility of removing the block with the presentation of an appropriate legitimization, or by registering another mobile device.

Also when a user must reset his mobile device, or upload an older security of the mobile device, such a process may be necessary, because the stored synchronization data are then lost.

The invention claimed is:

1. A method for securing an access method for vehicles, wherein the access method has at least one mobile device and one remote control system for administration of access rights, having the steps,
   repeated autonomous connection of the mobile device to the remote control system,
   generation of characteristic new synchronization data for each connection in the remote control system and transmitting the characteristic new synchronization data from the remote control system to the mobile device,
   storing at least part of the characteristic new synchronization data in the mobile device and in the remote control system,
   transmission of characteristic prior synchronization data of a preceding connection of the mobile device to the remote control system,
   checking for consistency in the remote control system between the prior synchronization data received from the mobile device and the prior synchronization data stored in the remote control system, wherein,
      in the event that the data are consistent, interrupting the connection, and waiting a synchronization interval, before resuming the connection for the next synchronization; and
      in the event that the data are inconsistent, blocking the mobile device from further access to vehicles.

2. The method according to claim 1, wherein asymmetric data are stored in the mobile device and in the remote control system.

3. The method according to claim 1, wherein a central platform is used as the remote control system, which administers the access rights for numerous users, vehicles and dedicated mobile devices, and communicates with numerous vehicle-side vehicle control systems for controlling access thereto.

* * * * *